United States Patent [19]

Wolf et al.

[11] 4,383,076

[45] May 10, 1983

[54] SINGLE COMPONENT ENAMELS BASED ON BLOCKED POLYISOCYANURATE POLYISOCYANATES

[76] Inventors: Elmar Wolf, Am Böckenbusch 3a; Rainer Gras, An der Ziegelei 91, both of 4690 Herne 2, Fed. Rep. of Germany

[21] Appl. No.: 186,958

[22] Filed: Sep. 15, 1980

[30] Foreign Application Priority Data

Sep. 26, 1979 [DE] Fed. Rep. of Germany ....... 2938855

[51] Int. Cl.³ .................... C08G 18/80; C08K 5/01; C08K 5/07; C08K 5/09
[52] U.S. Cl. .................................. 524/589; 524/590; 260/404.5; 528/45
[58] Field of Search .......................... 528/45; 524/589

[56] References Cited

U.S. PATENT DOCUMENTS

| | | | |
|---|---|---|---|
| 3,931,117 | 1/1976 | Leonard | 528/45 |
| 4,150,211 | 4/1979 | Mueller et al. | 528/45 |
| 4,151,152 | 4/1979 | Schmitt et al. | 528/45 |
| 4,212,962 | 7/1980 | Schmitt et al. | 528/45 |
| 4,246,380 | 1/1981 | Gras et al. | 528/45 |

*Primary Examiner*—H. S. Cockeram
*Attorney, Agent, or Firm*—Oblon, Fisher, Spivak, McClelland & Maier

[57] ABSTRACT

A single component enamel composition comprising a polyester component containing more than one hydroxy group in the molecule and a hardener component, said hardener comprising at least one diisocyanate capped with $\epsilon$-caprolactam and/or at least one polyisocyanate containing isocyanaturate groups capped with $\epsilon$-caprolactam.

8 Claims, No Drawings

SINGLE COMPONENT ENAMELS BASED ON BLOCKED POLYISOCYANURATE POLYISOCYANATES

BACKGROUND OF THE INVENTION

It is known to use polyisocyanates whose reactive groups are closed by reaction with monofunctional combinations to produce mixtures of polyisocyanates and polyoxy combinations that can be stored at normal temperature. Such products are usually called capped (or blocked) polyisocyanates and are described, for example, in the Annals, Vol. 562, 1949, pp. 205–229. Under the effects of increased temperature these products split back into their original materials allowing the liberated isocyanate groups in turn to react with the polyoxy combinations present in the reaction mixture.

An example of such a single component enamel system that can be stably stored at room temperature is that described in the German OS No. 23 46 818. It comprises an adduct of 3-isocyanatomethyl-3.5.5-trimethylcyclohexylisocyanate (isophorondiisocyanate=IPDI) dissolved in an enamel solvent with a high boiling point and a polyester containing hydroxyl groups based predominantly on aromatic dicarboxylic acids and a mixture of di- and tri-valent alcohols. This enamel system hardens at 180°–350° C. However, this system's hardening is too slow for some applications. Yet it is possible to considerably increase the hardening speeds by the use of catalysts such as tertiary amines or organotin compounds, for example. However, undesired secondary reactions often occur, especially in the presence of combinations that are capable of reacting with isocyanates. For example, they even split off monofunctional combinations from capped polyisocyanates at normal temperatures, making the mixture unstable.

It has now been found, surprisingly, that the hardening time can be shortened and the hardening temperature lowered by using hardeners comprising ε-caprolactam capped diisocyanates and/or ε-caprolactam capped polyisocyanates containing isocyanurate groups. The result is that hardening is quicker and can take place at lower temperatures the greater in proportion to increasing concentrations of isocyanurate in such mixtures.

The object of the present invention is a single component enamel, containing, when dissolved in a high boiling point, inert solvent, (a) a polyester containing more than one hydroxy group in the molecule, and (b) a mixture, as the hardener component, of ε-caprolactam blocked isocyanurates of the following formula:

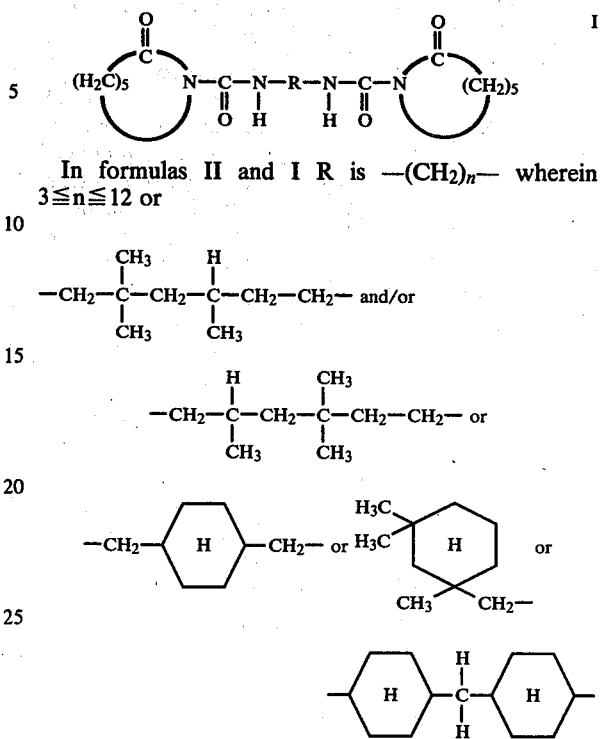

In formulas II and I R is —(CH$_2$)$_n$— wherein $3 \leq n \leq 12$ or

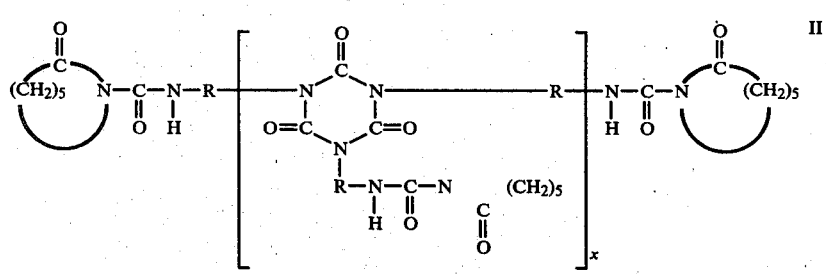

x is an integer of 1 to 4 or 0, and when zero, said formula is reduced to:

The hardener of formula II is itself a mixture of single compounds wherein the value of x is 1, 2, 3 or 4. The average value $\bar{x}$ of this mixture depends on the trimerization conditions. In the usual production methods the components with higher numerical values for x will occur less frequently.

The proportion of hardeners I and II can notably be varied within broad limits. For example, excellent results are achieved by mixing in, per OH-equivalent of the polyhydroxyl combinations, an equivalent capped NCO of the hardener mixture consisting of 99 to 0 parts by weight of hardener I and 1 to 100 parts by weight of hardener II, preferably 70 to 30 parts by weight of hardener I and 30 to 70 parts by weight of hardener II.

It is frequently advantageous to leave an amount of free NCO-, i.e., uncapped NCO groups, in the isocyanate adducts capped with ε-caprolactam in an amount of 0.1 to 10% by weight NCO, preferably 1 to 7% by weight NCO.

The hardener mixtures can be produced according to the following methods:

(A) MIXING THE BLOCKED INDIVIDUAL HARDENERS

First the NCO-groups of a (cyclo)-aliphatic diisocyanate are capped with ε-caprolactam to form hardener I. Also, the free NCO-groups of a diisocyanate-free polyisocyanate containing isocyanurate groups, produced by partial trimerization of a diisocyanate and then separation of the non-reacted diisocyanate by thin film distillation, are capped with ε-caprolactam to form hardener II. Hardeners I and II are mixed together in the desired proportions in the melt.

(B) "IN-SITU-MIXTURES"

A particularly preferred method of synthesis of the mixture of hardeners I and II consists of trimerizing a diisocyanate with the help of a trimerization catalyst to the degree desired in each case, then deactivating the catalyst and capping the free NCO-groups of this "in-situ-mixture" with ε-caprolactam so that between 0.1% and 10% of the groups remain uncapped.

In both production methods trimerization and subsequent reaction of the hardener mixture can also be done in a solvent, most advantageously in the solvent used later.

Diisocyanates particularly suited for in-situ-mixtures are those with strongly different NCO-group reactivity, e.g., isophoronediisocyanate.

Mixtures (according to the German OS No. 26 44 684) of 1,4-diazabicyclooctane [2.2.2] (DABCO) with propylene oxide have proven to be outstanding catalysts for trimerization. The catalyst can be easily deactivated and removed by being flushed out at a low temperature by an inert gas stream (particularly $N_2$) or by high temperature evacuation.

The polyesters containing hydroxyl groups which are reacted with the capped isocyanates in the present invention must have a low second order transition temperature. It should lie between +25° C. and −25° C.

The following are the essential ingredients of the polyester component:

(1) A cyclical polycarboxylic acid and/or its derivative such as phthalic acid, isophthalic acid, terephthalic acid, tetrahydro-, hexahydro- and methylhexahydrophthalic acid, benzol-1, 2,4-tricarboxylic acid, trimellitic-aceto-anhydride, dimethylterephthalate (DMT), or the like.

(2) A diol, e.g., glycol, 1,2-propanediol, 1,3-butanediol, 1,4-butanediol, 2,2-dimethylpropanediol, hexanediol-1,6,4,4'-dihydroxyldicyclohexylpropane-2.2, cyclohexanediol, 3-methylpentanediol-1,5,2,2,4-(2,4,4-) trimethylhexanediol-1,6-hydroxypivaline-acetoneopentylglycol ester, diethylene glycol and bis-oxyethylized 4,4'-dihydroxydiphenyl-2,2-propane, 1,4-dihydroxymethylcyclohexane, or the like.

(3) A polyol such as glycerine, hexanetriol, pentaerythritol, trimethylol propane, trimethylol ethane, or the like.

The polyesters can also contain mono-functional carboxylic acids such as benzoic acid, and acyclic polycarboxylic acids such as adipic acid, 2,4,4-(2,2,4)-trimethyladipic acid, sebacic acid, or dodecanedicarboxylic acid.

The polyesters can be produced in any known manner by esterification or transesterification, if necessary, in the presence of customary catalysts, whereby, through proper selection of the COOH/OH-ratio, end products can be obtained whose hydroxyl number is between 30 and about 240, preferably between about 60 and 150.

Suitable solvents for the single component enamels according to the invention are those whose lower boiling point is about 80° C. The upper limit of the boiling point of solvent depends on the respective enameling conditions. The higher the enameling temperature, the higher the boiling temperature of the solvent to be used must be. Suitable solvents include aromatic hydrocarbons such as toluene, mixed xylenes, tetralin, pseudocumene, and industrial mixtures of aromatics with narrow boiling ranges, e.g., SOLVESSO 150 by Esso; ketones such as methylisobutyl ketone, diisobutyl ketone, isophorone and esters such as acetic acid-n-hexylester, ethyleneglycol acetate, ethyl acetate, n-butyl acetate, and the like. These materials can also be used as mixtures. The concentration of the resin (oxyester/hardener) mixture in the solvents mentioned above is between 40 and 80% by weight, preferably between 50 and 70% by weight.

The single component enamels according to the invention can be produced in suitable mixing devices, e.g., stirring kettles, simply by mixing the three enamel components (solvent, oxyester, capped polyisocyanate) at 80°–100° C. The customary additives such as pigments, spreading agents, finish improvers, antioxidation ingredients, foam supressors, catalysts and heat stabilizers can also be easily added to the enamel solution.

The enamels according to the invention harden, depending on the use, in a temperature range of from 150°–350° C., preferably between 160°–300° C. in 45 to 0.75 minutes, preferably from 35 to 1.5 minutes. The hardened coatings exhibit outstanding enamel-technical characteristics. They are primarily used in coil-coating for external weather resistant one and two coat enamel applications.

EXAMPLES

A. Synthesis of a capped isocyanatoisocyanurate 1. 100 parts by weight of isophoronediisocyanate with an NCO-content of 37.8% is heated with 0.5% by weight of a catalyst system of 2 parts by weight of propylene oxide-1,2 and 1 part by weight of 1,4-diazabicyclooctane [2.2.2] (Dabco) for three hours at 120° C. During this time the NCO-content falls to 28.4%. This corresponds to an approximately 50% conversion to isocyanurate with a free NCO-group per isophorone unit.

To deactivate the catalyst the reaction mixture is cooled to 40° C. and bathed with a nitrogen stream for ½ hour at this temperature. The NCO-content of the reaction mixture reduces slightly more to 28.2%.

At 100° C., 76.5 parts by weight of ε-caprolactam are added to 100 parts by weight of the isocyanatoisocyanurate mixture in such a proportion that the reaction temperature is not allowed to exceed 120° C. The reaction mixture is held at 120° C. for 2 more hours to complete the reaction.

2. 100 parts by weight of isophoronediisocyanate are heated for 2 hours at 120° C. with 0.75 parts by weight of the catalyst system as described in Example 1. During this time the NCO-content falls from 37.8% to 28.4% (corresponding to an approximate 50% conversion to isocyanurate).

The catalyst is deactivated by evacuating for 15 minutes at 120° C. During this time the NCO-content of the reaction mixture changes to 26.0%.

At 110° C., 69.96 parts by weight of ε-caprolactam are added to 100 parts by weight of the isocyanatoisocyanurate mixture so that the reaction temperature does not exceed 120° C. The reaction mixture is also heated at 120° C. for 2 hours more to complete the reaction.

3. 100 parts by weight of isophoronediisocyanate are heated at 120° C. for 4.5 hours with 0.5 parts by weight of the catalyst described in Example 1. The progress of the trimerization is monitored by determining the refraction index, the viscosity or the NCO-content.

After the NCO-content had sunk to 25.8% (corresponding to an isocyanurate conversion of ca. 64%), the mixture was evacuated for ½ hour at 265 Pa. After cooling the reaction mixture had an NCO-content of 25%.

At 120° C., 67.3 parts by weight of ε-caprolactam is slowly stirred into 100 parts by weight of the isocyanato-isocyanurate mixture. After the ε-caprolactam has been successfully added the reaction mixture is heated another hour at 130° C.

Table 1 summarizes the experimental data. The lower part of the table describes the characteristics of the capped diisocyanato-isocyanurate mixtures produced in this manner and the 60% solutions produced from them.

TABLE 1

Experimental conditions and characteristics of the isocyanato-isocyanurate mixtures of Examples 1 through 2.

| Example No. | H1 | H2 | H3 |
|---|---|---|---|
| Amount of Catalyst/g 100 g IPDI | 0.5 | 0.75 | 0.5 |
| Trimerization temperature °C. | 120 | 120 | 120 |
| Trimerization time (hr.) | 3 | 2 | 4.5 |
| Isocyanurate formation (%) | 50 | 50 | 64 |
| Isocyanurate formation including subsequent formation (%) | 51 | 62 | 68 |
| Amount of ε-caprolactam/ 100 g mixture g | 76.5 | 69.95 | 67.3 |
| Capping temperature °C. | 100 to 120 | 110 to 120 | 120 |
| Post reaction/ duration (hr.) | 2 | 2 | 2 |
| Post reaction temp. °C. | 120 | 120 | 120 |
| Free NCO %: | <0.2 | <0.2 | <0.2 |
| Capped NCO %: | 16.0 | 15.2 | 14.8 |
| Melting range °C.: | 73–75 | 85–90 | 97–100 |
| Splitting Temp. °C.: | ca. 170 | ca. 170 | ca. 170 |
| Second order transition temp. (DTA) °C. | ca. 47 | ca. 50 | ca. 55 |
| Run down time of a 60% by weight solution at 20° C. (DIN 4 Becher) according DIN 53211 | | | |
| Solvent mixture A | sec. 23 | 46 | 52 |
| Solvent mixture B | sec. 40 | 61 | 70 |
| Solvent mixture C | sec. 75 | 119 | 143 |

Solvent mixture A is made up of 1 part by weight of n-butylacetate and 3 parts by weight of industrial xylol, solvent mixture B of 1 part by weight ethylene glycol acetate (EGA) and 2 parts by weight of industrial xylol, and solvent mixture C of 1 part by weight of ethylene glycol acetate (EGA) and 2 parts by weight of the industrial aromatic mixture SOLVESSO 150 (of the ESSO Co.) having a boiling range of 177° to 206° C. and a dew point of at least 66° C.

B. POLYESTER PRODUCTION

The ingredients listed in Table 2 were esterified in a heated reactor, while a weak $N_2$-stream was fed therethrough in the presence of 0.05% by weight of di-n-butyl-stannous oxide as a catalyst until the acid number was below 2 mg KOH/g. With polyester P 1, where the reaction was carried out in a 4 l glass beaker, hydrolysis of the ester began at about 190° C. Within 6 to 8 hours the temperature was raised to 220° C. Esterification was then completed in another 6 hours at 220° C.

The polyesters produced in this manner were then cooled to 200° C. and volatile material therein was extensively removed by evacuation at 1300 to 2200 Pa for 30 to 45 minutes.

Table 2 contains a summary of the physical data of the polyesters.

TABLE 2

| | | Polyester | | |
|---|---|---|---|---|
| | | P1 | P2 | P3 |
| Polyester Recipe | | | | |
| Isophthalic acid | Mole | 7 | 18 | 17 |
| | g | 1162 | 2988 | 2822 |
| Trimethylol propane-1.5 | Mole | 2 | 2 | 2 |
| | g | 268 | 268 | 268 |
| Hexane diol-1.6 | Mole | 5 | 14 | 13 |
| | g | 590 | 1652 | 1534 |
| 3-methylpentane diol | Mole | 1 | — | — |
| | g | 118 | — | — |
| Neopentyl glycol | Mole | — | 5 | 5 |
| | g | — | 520 | 520 |
| Decane dicarboxylic acid-1,10 | Mole | — | — | 1 |
| | g | — | — | 230 |
| Hydroxypivaline acid neopentyl glycolester | Mole | — | — | 1 |
| | g | — | — | 204 |
| Di-n-butyl-stannous oxide | % b.w. | 0.05 | 0.05 | 0.05 |
| | g | 1.07 | 2.71 | 2.79 |
| Physical Data | | | | |
| OH-number | mgKOH/g | 100 to 105 | 80 to 90 | 80 to 90 |
| Acid number | mgKOH/g | <2 | <1 | <2 |
| Second order transition temperature °C. (DTA) | | 4–12 | 2–16 | 4–15 |
| Run out time of a 60% solution at 20° C. (DIN4 Becher) according to DIN 53211 | | | | |
| Solvent mixture A | (sec.) | 300 | 130 | 110 |
| Solvent mixture B | (sec.) | 470 | 197 | 174 |
| Solvent mixture C | (sec.) | 750 | 345 | 275 |

C POLYURETHANE ENAMELS

The hardeners described in section A and the polyesters described in section B were used in the formulation of pigmented enamel systems, in a 60% solution in each case. Solvent mixture A was used for lower enameling temperatures (see page 11), and preferably solvent mixture C for higher enameling temperatures. In each case the amounts of polyester solution given in Table 3 were used with the amounts of hardener solution described. Enamel solutions produced in this manner do not change in storage.

After adding 300 parts by weight in each case of white pigment and 2 parts by weight of silicon oil OL as a spreading agent, this mixture was ground in a sand grinder.

The pigmented enamel system EL-G8 obtained in this manner were applied to steel or aluminum sheets 1 mm thick. The enamel film thicknesses were between 25 and 30 μm. Hardening was done in a ventilated cabinet for the times and at the temperatures given in tables 4a to h in columns 1 and 2.

The following abbreviations are used in tables 4a to h:

| | |
|---|---|
| h: | |
| HK | = Hardness according to Konig (insec) (DIN 53 157) |
| HB | = Hardness according to Buchholz (DIN 53 153) |
| ET | = cupping according to Erichsen (in mm) (DIN 53 156) |
| Imp. rev. | = Impact reverse (inch · lb) (Ball impact according to GARDNER) (ASTM D 2794) |

The T-Bend-Test gives the number of sheets of the same thickness which when stacked together at the bend and pressed together in the direction of the bend in a press show no tears at the bend.

In the pencil test according to Wolf-Willborn pencils of 17 hardness grades from 6B to 9H are used at an angle of 45° and a face of 7.5 N to "write" on the painted surface. The hardness grade indicated is that at which a scratch was first observed in the enameled surface. (Compare operating instructions 291 D of the Ericksen Co., 5070 Hemer-Sundwig). Since the enamels showed no film damage until the H-hardnesses, the letter H was indicated only in the superscript of the individual tables.

| | |
|---|---|
| GS | = grid test (DIN 53 151) |
| GG 20° and 60° | = measurement of the gleam according to Gardner (ASTM-D 523) |

The recipes are summarized in Table 3 below and the hardness characteristics and mechanical data of the enamel films are shown in Table 4a to h.

TABLE 3

Recipes of the pigmented polyurethane enamels E1 to E8

| Type of Combination | E1 P1/H1 | E2 P1/H2 | E3 P2/H1 | E4 P2/H2 | E5 P2/H3 | E6 P3/H1 | E7 P3/H2 | E8 P3/H3 |
|---|---|---|---|---|---|---|---|---|
| Polyester solution p.b.w. | 475,51 | 467,67 | 507,89 | 500,72 | 496,9 | 463,51 | 500,72 | 496,9 |
| Hardener solution p.b.w. | 222,49 | 230,33 | 190,11 | 197,28 | 201,1 | 234,49 | 197,28 | 201,1 |
| White pigment (TiO$_2$) p.b.w. | 300,00 | 300,00 | 300,00 | 300,00 | 300,00 | 300,00 | 300,00 | 300,00 |
| Spread agent p.b.w. (silicon oil) | 2,00 | 2,00 | 2,00 | 2,00 | 2,00 | 2,00 | 2,00 | 2,00 |
| Characteristics see table 4 | a | b | c | d | e | f | g | h |

4a Enamel E1 (P1/H1)

| Hardening Conditions | | | Mechanical Data | | | | | |
|---|---|---|---|---|---|---|---|---|
| Time Min/ Temp. °C. | HK sec. | HB — | ET mm | Imp. rev. inch · lb | T-Bend- Test | Pencil hardness H | GS | GG 20° | GG 60° |
| 20/170 | 177 | 100 | >10 | >82 | 1-2 | 2 | 0 | 79 | 88 |
| 15/180 | 175 | 111 | >10 | >82 | 1 | 1-2 | 0 | 80 | 87 |
| 7/200 | 176 | 100 | >10 | >82 | 2 | 2 | 0 | 80 | 85 |
| 10/200 | 181 | 100 | >10 | >82 | 1 | 1-2 | 0 | 76 | 86 |
| 1,5/300 | 170 | 111 | >10 | >82 | 1-2 | 2 | 0 | 77 | 86 |

4b Enamel E2 (P1/H2)

| Hardening Conditions | | | Mechanical Data | | | | | |
|---|---|---|---|---|---|---|---|---|
| Time Min/ Temp. °C. | HK sec. | HB — | ET mm | Imp. rev. inch · lb | T-Bend- Test | Pencil hardness H | GS | GG 20° | GG 60° |
| 20/170 | 175 | 100 | >10 | >82 | 1 | 2 | 0 | 78 | 88 |
| 15/180 | 176 | 101 | >10 | >82 | 2 | 2-3 | 0 | 80 | 89 |
| 7/200 | 180 | 100 | >10 | >82 | 1-2 | 2-3 | 0 | 79 | 89 |
| 10/200 | 179 | 111 | >10 | >82 | 2 | 3 | 0 | 78 | 90 |
| 1,5/300 | 182 | 111 | >10 | >82 | 2 | 2 | 0 | 78 | 88 |

4c Enamel E3 (P2/H1)

| Hardening Conditions | | | Mechanical Data | | | | | |
|---|---|---|---|---|---|---|---|---|
| Time Min/ Temp. °C. | HK sec. | HB — | ET mm | Imp. rev. inch · lb | T-Bend- Test | Pencil hardness | GS | GG 20° | GG 60° |
| 35/160 | 164 | 100 | >10 | >82 | 1-2 | 1 | 0 | 79 | 88 |
| 20/170 | 172 | 100 | >10 | >82 | 0 | 1-2 | 0 | 72 | 89 |
| 15/180 | 170 | 100 | >10 | >82 | 0 | 2 | 0 | 70 | 84 |
| 7/200 | 172 | 100 | >10 | >82 | 0 | 2 | 0 | 74 | 86 |
| 10/200 | 171 | 111 | >10 | >82 | 0 | 2 | 0 | 72 | 87 |
| 1,5/300 | 162 | 100 | >10 | >82 | 0 | 1-2 | 0 | 70 | 87 |

4d Enamel E4 (P2/H2)

| Hardening Conditions Time Min/Temp. °C. | HK sec. | HB — | ET mm | Imp. rev. inch·lb | T-Bend-Test | Pencil hardness H | GS | GG 20° | GG 60° |
|---|---|---|---|---|---|---|---|---|---|
| 35/160 | 170 | 100 | >10 | >82 | 0 | 1-2 | 0 | 74 | 86 |
| 20/170 | 175 | 111 | >10 | >82 | 0-1 | 2 | 0 | 75 | 89 |
| 15/180 | 172 | 100 | >10 | >82 | 0 | 2-3 | 0 | 72 | 88 |
| 7/200 | 175 | 111 | >10 | >82 | 0 | 2 | 0 | 74 | 89 |
| 10/200 | 174 | 111 | >10 | >82 | 0 | 2-3 | 0 | 75 | 90 |
| 1,5/300 | 164 | 100 | >10 | >82 | 0 | 2 | 0 | 72 | 86 |

4e Enamel E5 (P2/H3)

| Hardening Conditions Time Min/Temp. °C. | HK sec. | HB — | ET mm | Imp. rev. inch·lb | T-Bend-Test | Pencil hardness H | GS | GG 20° | GG 60° |
|---|---|---|---|---|---|---|---|---|---|
| 35/160 | 178 | 100 | >10 | >82 | 0-1 | 2 | 0 | 79 | 89 |
| 20/170 | 180 | 111 | >10 | >82 | 0 | 2 | 0 | 80 | 90 |
| 15/180 | 182 | 100 | >10 | >82 | 0 | 2 | 0 | 78 | 89 |
| 7/200 | 179 | 100 | >10 | >82 | 0 | 2 | 0 | 76 | 88 |
| 10/200 | 178 | 111 | >10 | >82 | 0 | 2-3 | 0 | 78 | 90 |
| 1,33/300 | 168 | 100 | >10 | >82 | 0-1 | 2 | 0 | 77 | 89 |

4f Enamel E8 (P3/H1)

| Hardening conditions Time Min/Temp. °C. | HK sec. | HB — | ET mm | Imp-rev. inch·lb | T-Bend-Test | Pencil hardness H | GS | GG 20° | GG 60° |
|---|---|---|---|---|---|---|---|---|---|
| 20/170 | 184 | 111 | >10 | >82 | 1-2 | 2-3 | 0 | 77 | 86 |
| 15/180 | 180 | 111 | >10 | >82 | 2 | 3 | 0 | 75 | 87 |
| 7/200 | 177 | 100 | >10 | >82 | 2 | 2-3 | 0 | 77 | 86 |
| 10/200 | 183 | 100 | >10 | >82 | 1-2 | 3 | 0 | 74 | 85 |

4g Enamel E6 (P3/H2)

| Hardening Conditions Time Min/Temp. °C. | HK sec. | HB — | ET mm | Imp. rev. inch·lb | T-Bend-Test | Pencil hardness H | GS | GG 20° | GG 60° |
|---|---|---|---|---|---|---|---|---|---|
| 35/160 | 162 | 100 | >10 | >82 | 0 | 2 | 0 | 72 | 84 |
| 20/170 | 163 | 100 | >10 | >82 | 0 | 2 | 0 | 72 | 85 |
| 15/180 | 164 | 111 | >10 | >82 | 0 | 2 | 0 | 72 | 86 |
| 7/200 | 164 | 100 | >10 | >82 | 0 | 2 | 0 | 71 | 87 |
| 10/200 | 167 | 111 | >10 | >82 | 0 | 2-3 | 0 | 70 | 86 |
| 1,50/300 | 160 | 111 | >10 | >82 | 0 | 2 | 0 | 70 | 87 |

4h Enamel E7 (P3/H3)

| Hardening Conditions Time Min/Temp. °C. | HK sec. | HB — | ET mm | Imp. rev. inch·lb | T-Bend-Test | Pencil hardness H | GS | GG 20° | GG 60° |
|---|---|---|---|---|---|---|---|---|---|
| 35/160 | 168 | 100 | >10 | >82 | 0-1 | 2 | 0 | 75 | 87 |
| 20/170 | 170 | 100 | >10 | >82 | 0-1 | 2 | 0 | 79 | 90 |
| 15/180 | 169 | 100 | >10 | >82 | 0 | 2-3 | 0 | 76 | 87 |
| 7/200 | 169 | 100 | >10 | >82 | 0-1 | 2 | 0 | 76 | 89 |
| 10/200 | 171 | 111 | >10 | >82 | 0 | 2-3 | 0 | 77 | 88 |
| 1,50/300 | 166 | 100 | >10 | >82 | 1 | 2 | 0 | 78 | 87 |

We claim:

1. A single component enamel composition, comprising:
from 40% to 80% by wt of a resin in at least one solvent, said resin comprising a polyester component containing more than one hydroxy group in the molecule and having a second order transition temperature ranging between +25° C. and −25° C. and a hardener component of the formula:

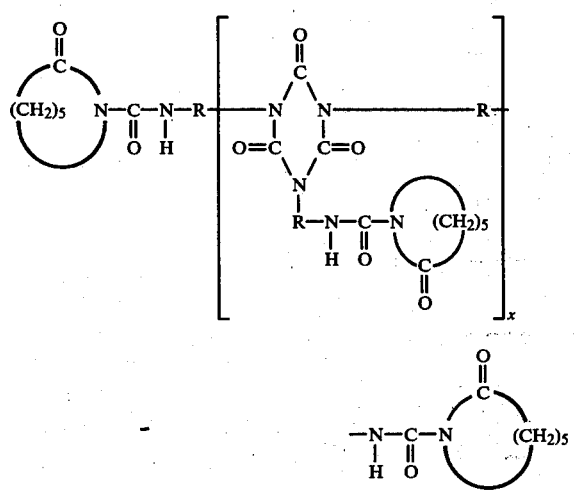

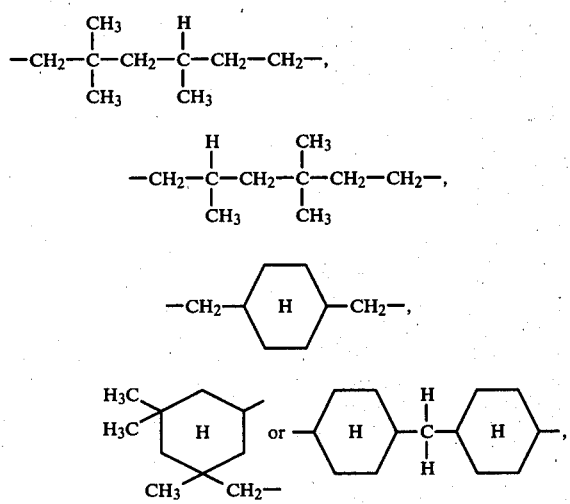

wherein x ranges from 0 to 4 with the proviso that at a minimum, the hardener must comprise a material having a value for x of one, and wherein R is —(CH$_2$)$_n$— with $3 \leq n \leq 12$, or is $$-CH_2-\underset{\underset{CH_3}{|}}{\overset{\overset{CH_3}{|}}{C}}-CH_2-\underset{\underset{CH_3}{|}}{\overset{\overset{H}{|}}{C}}-CH_2-CH_2-,$$

$$-CH_2-\underset{\underset{CH_3}{|}}{\overset{\overset{H}{|}}{C}}-CH_2-\underset{\underset{CH_3}{|}}{\overset{\overset{CH_3}{|}}{C}}-CH_2-CH_2-,$$

said hardener prepared by adding a mixture of propylene oxide and 1,4-diazabicyclooctane (2,2,2) as a catalyst to a cycloaliphatic diisocyanate, trimerizing said diisocyanate to the desired degree, deactivating the catalyst and then capping said trimerized isocyanurate with ε-caprolactam.

2. The composition of claim 1, wherein said hardener comprises 99 to zero parts by weight of said capped diisocyanate which has a value of x equal to zero and 1 to 100 parts by weight of said capped polyisocyanate containing isocyanurate moieties whose values for x are $1 \leq x \leq 4$.

3. The composition of claim 2, wherein said hardener comprises from 70 to 30 parts by weight of the hardener having a value for x of zero and 30 to 70 parts by weight of at least one hardener having values for x of 1, 2, 3 or 4.

4. The composition of claim 2 or 3, wherein said hardener is produced by thorough mixing, optionally in a solution, of the separately prepared hardeners having values for x of zero and 1, 2, 3 or 4.

5. The composition of claim 2 or 3, wherein the hardener is a mixture prepared by adding a trimerization catalyst to a (cyclo-) aliphatic diisocyanate, trimerizing said diisocyanate to the desired degree, deactivating the catalyst and then capping said trimerized isocyanate with ε-caprolactam.

6. The composition of claim 1, 2 or 3, containing isocyanurate groups capped with ε-caprolactam, wherein the isocyanate group containing components of said hardener are capped with ε-caprolactam in such a manner that 0.1 to 10% by weight of the isocyanate functional groups remain uncapped.

7. The composition of claim 1, 2 or 3, containing isocyanurate groups capped with ε-caprolactam, wherein said solvent has a boiling point between 80° C. and 250° C. and is selected from the group consisting of an aromatic hydrocarbon, a ketone, an ester and mixtures thereof.

8. The composition of claim 7, wherein said aromatic hydrocarbon is toluene, mixed xylenes, tetralin or pseudocumene; said ketone is methylisobutyl ketone, diisobutyl ketone or isophorone and said ester is acetic acid-n-hexylester, ethyleneglycol acetate, ethyl acetate or n-butyl acetate.

* * * * *

UNITED STATES PATENT AND TRADEMARK OFFICE
CERTIFICATE OF CORRECTION

PATENT NO. : 4,383,076
DATED : May 10, 1983
INVENTOR(S) : Elmar Wolf et al

It is certified that error appears in the above-identified patent and that said Letters Patent is hereby corrected as shown below:

On the title page add assignee:

--[73] Chemische Werke Huls Aktiengesellschaft

West Germany --

Signed and Sealed this

Fourth Day of October 1983

[SEAL]

Attest:

GERALD J. MOSSINGHOFF

Attesting Officer

Commissioner of Patents and Trademarks